(12) United States Patent
Lu et al.

(10) Patent No.: US 12,022,543 B2
(45) Date of Patent: Jun. 25, 2024

(54) METHOD FOR TRANSMITTING DATA IN INTERNET OF VEHICLES AND TERMINAL DEVICE

(71) Applicant: GUANGDONG OPPO MOBILE TELECOMMUNICATIONS CORP., LTD., Dongguan (CN)

(72) Inventors: Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 616 days.

(21) Appl. No.: 17/134,528

(22) Filed: Dec. 28, 2020

(65) Prior Publication Data

US 2021/0120614 A1 Apr. 22, 2021

Related U.S. Application Data

(63) Continuation of application No. PCT/CN2018/094680, filed on Jul. 5, 2018.

(51) Int. Cl.
*H04W 76/15* (2018.01)
*H04W 4/40* (2018.01)
(Continued)

(52) U.S. Cl.
CPC .............. *H04W 76/15* (2018.02); *H04W 4/40* (2018.02); *H04W 72/0446* (2013.01);
(Continued)

(58) Field of Classification Search
CPC ....... H04W 76/15; H04W 76/14; H04W 4/40; H04W 72/20; H04W 72/0446; H04W 72/0453

See application file for complete search history.

(56) References Cited

U.S. PATENT DOCUMENTS

2016/0066337 A1 3/2016 Sartori et al.
2017/0127405 A1 5/2017 Agiwal et al.
(Continued)

FOREIGN PATENT DOCUMENTS

CN 105813204 A 7/2016
CN 106303899 A 1/2017
(Continued)

OTHER PUBLICATIONS

Second Office Action issued in corresponding European application No. 18925610.0, dated Aug. 10, 2022.
(Continued)

*Primary Examiner* — Justin Y Lee
(74) *Attorney, Agent, or Firm* — BAYES PLLC

(57) ABSTRACT

A method for transmitting data in an Internet of Vehicles and a terminal device disclosed in the present disclosure allow the determination of a resource used for multiple transmissions of a sidelink and favor an increase in the reliability of data transmissions. The method includes a first terminal receiving first control information transmitted by a second terminal. The first control information is used for determining resource information used for multiple transmissions of a sidelink. The method also includes the first terminal determining, on the basis of the first control information, a resource used for multiple transmissions of the sidelink.

12 Claims, 3 Drawing Sheets

200

First terminal receives first control information transmitted by second terminal, the first control information being used for determining resource information used for multiple transmissions of sidelink — S210

The first terminal determines. on the basis of the first control information a resource used for multiple transmissions of the sidelink — S220

(51) Int. Cl.
| | |
|---|---|
| H04W 72/0446 | (2023.01) |
| H04W 72/0453 | (2023.01) |
| H04W 72/20 | (2023.01) |
| H04W 76/14 | (2018.01) |
| H04W 92/18 | (2009.01) |

(52) U.S. Cl.
CPC ....... *H04W 72/0453* (2013.01); *H04W 72/20* (2023.01); *H04W 76/14* (2018.02); *H04W 92/18* (2013.01)

(56) References Cited

U.S. PATENT DOCUMENTS

| | | | |
|---|---|---|---|
| 2017/0230956 | A1 | 8/2017 | Kim et al. |
| 2017/0289733 | A1 | 10/2017 | Rajagopal et al. |
| 2018/0098322 | A1* | 4/2018 | Yoon ................. H04W 56/0005 |
| 2019/0075546 | A1 | 3/2019 | Yasukawa et al. |
| 2019/0174530 | A1 | 6/2019 | Kim et al. |
| 2019/0230633 | A1 | 7/2019 | Chae et al. |
| 2020/0077434 | A1 | 3/2020 | Kim et al. |
| 2020/0137782 | A1 | 4/2020 | Su et al. |
| 2021/0068079 | A1* | 3/2021 | Sahin ................... H04W 72/51 |

FOREIGN PATENT DOCUMENTS

| | | |
|---|---|---|
| CN | 106797635 A | 5/2017 |
| CN | 107027105 A | 8/2017 |
| CN | 107534828 A | 1/2018 |
| CN | 107925906 A | 4/2018 |
| CN | 108024310 A | 5/2018 |
| CN | 108141847 A | 6/2018 |
| EP | 3481125 A1 | 8/2019 |
| JP | 2017524308 A | 8/2017 |
| RU | 2658663 C1 | 6/2018 |
| WO | 2015115506 A1 | 8/2015 |
| WO | 2016163972 A1 | 10/2016 |
| WO | 2017077976 A1 | 5/2017 |
| WO | 2018004322 A1 | 1/2018 |
| WO | 2018058418 A1 | 4/2018 |
| WO | 2019001409 A1 | 1/2019 |
| WO | 2019007154 A1 | 1/2019 |
| WO | 2019090522 A1 | 5/2019 |
| WO | 2020/006736 A1 | 1/2020 |

OTHER PUBLICATIONS

First Office Action issued in corresponding Singaporean application No. 11202013205U, dated Aug. 18, 2022.
Second Office Action issued in corresponding Chinese application No. 202110190401.8, dated Oct. 14, 2022.
First Office Action issued in corresponding Taiwanese application No. 108123282, dated Aug. 15, 2022.
First Office Action issued in corresponding Korean application No. 10-2021-7003596, dated Apr. 25, 2023.
Notice of Termination of Reconsideration by Examiners before Appeal Proceedings issued in corresponding Japanese application No. 2021-500112, mailed Jun. 2, 2023.
Reconsideration Report by Examiner before Appeal issued in corresponding Japanese application No. 2021-500112, mailed May 30, 2023.
Notice of Termination of Reconsideration by Examiners before Appeal Proceedings issued in corresponding Japanese application No. 2021-500114, mailed Jul. 7, 2023.
Reconsideration Report by Examiner before Appeal issued in corresponding Japanese application No. 2021-500114, mailed Jun. 30, 2023.
NTT Docomo, Inc., "Discussion on enahancement of scheduling assignement in V2V communications", R1-167359, 3GPP TSG RAN WG1 Meeting #86 Gothenburg, Sweden Aug. 22-26, 2016.
Decision of Rejection issued in corresponding Japanese application No. 2021-500114, dated Jan. 6, 2023.

Third Office Action issued in corresponding European application No. 18925610.0, dated Feb. 28, 2023.
First Office Action issued in corresponding European Application No. 18925610.0, dated Mar. 14, 2022, 10 pages.
First Office action issued in corresponding India Application No. 202127004519, dated Jan. 18, 2022, 6 pages.
Extended European Search Report issued in corresponding European Patent Application No. 18925610.0, dated Jun. 21, 2021, 8 pages.
First Office action issued in corresponding Russian Application No. 2021102254, dated Aug. 3, 2021, 12 pages.
PCT Written Opinion of the International Searching Authority issued in corresponding International Application No. PCT/CN2018/094680, dated Apr. 10, 2019, 9 pages.
3rd Generation Partnership Project; Technical Specification Group Radio Access Network; Evolved Universal Terrestrial Radio Access (E-UTRA); Physical layer procedures (Release 15), Technical Specification, 3GPP TS 36.213 V15.1.0 (Mar. 2018), 495 pages.
First Office Action issued in corresponding Japanese Application No. 2021-500114, dated Jun. 24, 2022, 10 pages.
International Search Report and Written Opinion from the International Searching Authority Re. Application No. PCT/CN2018/094681, dated Apr. 12, 2019, 13 pages.
Extended European Search Report issued in corresponding European Application No. 18925199.4, dated Jun. 1, 2021, 14 pages.
First Office Action issued in corresponding Canadian Application No. 3,105,316, dated Dec. 20, 2021, 4 pages.
Priority Review issued in corresponding Chinese Application No. 202110069960.3, dated May 19, 2022, 6 pages.
First Office Action issued in corresponding Chinese Application No. 202110069960.3, dated Jun. 1, 2022, 21 pages.
First Office Action issued in corresponding Chinese Application No. 202110190401.8, dated Jul. 5, 2022, 19 pages.
First Office Action issued in corresponding Japanese Application No. 2021-500112, dated Jun. 24, 2022, 12 pages.
Non-Final Office Action issued in U.S. Appl. No. 17/131,634, dated Apr. 1, 2022, 8 pages.
"Discussion on SCI contents for V2V", R1-164103, Source: Huawei, HiSilicon, 3GPP TSG RAN WG1 Meeting #85, Nanjing, China, May 23-27, 2016, 6 pages.
"Scheduling assignment for sidelink V2V communication", R1-166516, Source: Intel Corporation, 3GPP TSG RAN WG1 Meeting #86, Gothenburg, Sweden, Aug. 22-26, 2016, 13 pages.
"Details of resource pool design for sidelink V2V communication", R1-166515, Source: Intel Corporation, 3GPP TSG RAN WG1 Meeting #86 Gothenburg, Sweden, Aug. 22-26, 2016, 10 pages.
"UE procedures related to Sidelink", 3GPP Draft; SUBC 14-D2D—, 3rd Generation Partnership Project (3GPP), Mobile Competence Centre ; 650, Route Des Lucioles; F-06921 Sophia-Antipolis Cedex; France; Dec. 3, 2014 (Dec. 3, 2014), XP050919795, 18 pages.
"Enhancement to resource pool structure of PCS-based V2V", R1-160394, Source: NEC, 3GPP TSG-RAN WG1 Meeting #84 St. Julian's, Malta, Feb. 15-19, 2016, 4 pages.
"On enhancements to resource pool configuration for V2V communication", R1-156690, Source: Intel Corporation, 3GPP TSG RAN WG1 Meeting #83 Anaheim, USA, Nov. 15-22, 2015, 8 pages.
"SA design for V2V", R1-162680, Source: Samsung, 3GPP TSG RAN WG1 #84bis, Busan, Korea Apr. 11-15, 2016, 5 pages.
Schlienz, J.; Roessler, A. "Device to Device Communication in LTE" Whitepaper, Sep. 29, 2015 (Sep. 29, 2015), 36 pages.
Fourth Office Action issued in corresponding European application No. 18925610.0, dated Aug. 29, 2023.
Second Office Action issued in corresponding Korean application No. 10-2021-7003596, dated Oct. 26, 2023.
Trial/Appeal Decision issued in corresponding Japanese application No. 2021-500114, mailed Nov. 10, 2023.
Trial/Appeal Decision issued in corresponding Japanese application No. 2021-500112, mailed Nov. 7, 2023.
Third Office Action issued in corresponding Canadian application No. 3105316, dated Sep. 18, 2023.
First Office Action issued in corresponding European application No. 18925199.4, mailed Dec. 5, 2023.

(56) References Cited

OTHER PUBLICATIONS

First Office Action issued in corresponding Mexican application No. MX/A/2021/000190, mailed Jan. 11, 2024.
First Office Action issued in corresponding Australian application No. 2018430770, mailed Jan. 11, 2024.
Hearing Notice issued in corresponding Indian application No. 202127004519, mailed Jan. 23, 2024.
First Office Action issued in corresponding Australian application No. 2018430771, mailed Mar. 25, 2024.
Notice of Allowance issued in corresponding European application No. 18925610.0, mailed Apr. 8, 2024.
3GPP TS 36.213 V15.2.0 (Jun. 2018); 3rd Generation Partnership Project; Technical Specification Group Radio Access Network; Evolved Universal Terrestrial Radio Access (E-UTRA);Physical layer procedures(Release 15).

* cited by examiner

METHOD FOR TRANSMITTING DATA IN INTERNET OF VEHICLES AND TERMINAL DEVICE

CROSS-REFERENCE TO RELATED APPLICATION

The present disclosure is a continuation application of International Application No. PCT/CN2018/094680, filed Jul. 5, 2018, the entire contents of which are incorporated herein by reference.

BACKGROUND

The embodiments of the present disclosure relate to the field of communications technologies, and in particular, to a method for transmitting data in Internet of Vehicles (IoV) and a terminal device.

The IoV system adopts sidelink (SL) transmission technology based on the long-term evolution vehicle to vehicle (LTE V2V). Different from the traditional LTE system in which communication data is received or sent through the base station, the terminal-to-terminal direct communication is adopted in the IoV system, so it has higher spectrum efficiency and lower transmission delay.

In the IoV system, a terminal device may determine a transmission mode of sidelink data according to the sidelink control information (SCI), where the SCI carries the control information corresponding to the data transmission, such as the modulation and coding scheme (MCS), time-frequency resource allocation information, resource reservation information, and the like. Another terminal device receiving the SCI obtains information such as the time-frequency resource location for data transmission by detecting the SCI, thereby determining whether the time-frequency resource is available. If the other terminal device cannot successfully detect the SCI, it can determine the resource for data transmission by measuring energy on each transmission resource. For example, the transmission resource may be sorted according to the energy level, and resource with lower energy may be selected for data transmission.

The vehicle to everything (V2X) system based on New Radio (NR) needs to support automatic driving, which puts forward higher requirements for data interaction between vehicles, such as higher reliability requirements. Therefore, how to achieve reliable SL transmission is an urgent problem to be solved.

SUMMARY

Embodiments of the present disclosure provide a method for transmitting data in IoV and a terminal device, which can determine resource used for multiple SL transmissions, thereby achieving the multiple SL transmissions and increasing the reliability of data transmission.

According to a first aspect, there is provided a method for data transmission in IoV, including receiving, by a first terminal, first control information sent by a second terminal, the first control information being used for determining resource information used for multiple SL transmissions; and determining, by the first terminal according to the first control information, resource used for the multiple SL transmissions.

According to a second aspect, there is provided a terminal device configured to perform the method according to the first aspect or any possible implementation manner thereof. Specifically, the terminal device includes a unit configured to perform the method according to the first aspect or any possible implementation manner thereof.

According to a third aspect, there is provided a terminal device including a processor and a memory, wherein the memory is configured to store a computer program, and the processor is configured to call and run the computer program stored in the memory, thereby performing the method according to the first aspect or any possible implementation manner thereof.

According to a fourth aspect, there is provided a chip configured to perform the method according to the first aspect or any possible implementation manner thereof.

Specifically, the chip includes a processor configured to call and run a computer program from a memory, causing a device installed with the chip to perform the method according to the first aspect or any possible implementation manner thereof.

According to a fifth aspect, there is provided a computer-readable storage medium used for storing a computer program that causes a computer to perform the method according to the first aspect or any possible implementation manner thereof.

According to a sixth aspect, there is provided a computer program product, including computer program instructions that cause a computer to perform the method according to the first aspect or any possible implementation manner thereof.

According to a seventh aspect, there is provided a computer program, when being executed on a computer, causing the computer to perform the method according to the first aspect or any possible implementation manner thereof.

Based on the above technical solution, the first terminal can determine the resource used for multiple SL transmissions according to the first control information of the second terminal and, further, the first terminal can receive, over the resource used for the multiple SL transmissions, data sent by the second terminal multiple times on SL, thereby improving the reliability of SL transmission.

DETAILED DESCRIPTION

The technical solutions in the embodiments of the present disclosure will be described below in conjunction with the drawings according to the embodiments of the present disclosure. The described embodiments are only part of the embodiments of the present disclosure, rather than all of the embodiments. Based on the embodiments of the present disclosure, all other embodiments obtained by those of ordinary skill in the art without creative work shall fall within the protection scope of the present disclosure.

It should be understood that the technical solutions of the embodiments of the present disclosure may be applied to a device to device (D2D) communication system, for example, an IoV system in which D2D communication is performed based on long term evolution (LTE) technology. Different from the traditional LTE system in which communication data between terminals is received or sent through a network device (e.g., base station), the terminal-to-terminal direct communication is adopted in the IoV system, so it has higher spectrum efficiency and lower transmission delay.

Optionally, the IoV system is implemented based on a communication system including a global system of mobile communication (GSM) system, code division multiple access (CDMA) system, wideband code division multiple access (WCDMA) system, general packet radio service (GPRS), LTE system, LTE frequency division duplex (FDD) system, LTE time division duplex (TDD), universal mobile telecommunication system (UMTS), worldwide interoperability for microwave access (WiMAX) communication system, 5G New Radio (NR) system, and the like.

The terminal device in the embodiments of the present disclosure may be a terminal device capable of implementing D2D communication. For example, it may be a vehicle-mounted terminal device, a terminal device in 5G network, or a terminal device in future-evolved public land mobile network (PLMN), which is not limited in the embodiments of the present disclosure.

Figure 1:
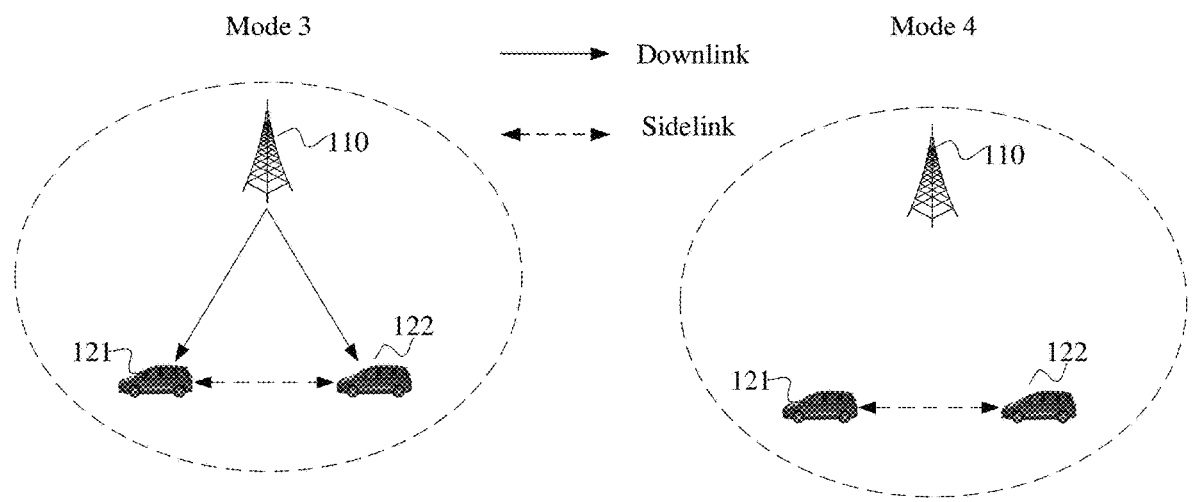
FIG. 1 is a schematic diagram illustrating a communication system architecture according to an embodiment of the present disclosure.

FIG. 1 is a schematic diagram illustrating an application scenario of an embodiment of the present disclosure. FIG. 1 exemplarily shows one network device 110 and two terminal devices 121 and 122. Optionally, the wireless communication system in the embodiments of the present disclosure may include multiple network devices, and the coverage of each network device may include other numbers of terminal devices, which is not limited in the embodiments of the present disclosure.

Optionally, the wireless communication system may also include other network entities, such as a mobile management entity (MME), a serving gateway (S-GW), a packet data network gateway (P-GW), and the like. Optionally, the wireless communication system may also include other network entities, such as session management function (SMF), unified data management (UDM), authentication server function (AUSF) and the like. Embodiments of the present disclosure are not limited thereto.

In the IoV system, terminal devices may perform communications in mode 3 and mode 4.

Specifically, the terminal device 121 and the terminal device 122 may communicate in a D2D communication mode. When performing D2D communication, the terminal device 121 and the terminal device 122 directly communicate with each other through the D2D link, that is, the sidelink (SL). For example, in mode 3, the transmission resource of the terminal device is allocated by a base station, and the terminal device can send data on the SL according to the resource allocated by the base station. The base station may allocate resource for a single transmission to the terminal device or allocate resource for semi-static transmission to the terminal device. In mode 4, the terminal device adopts a transmission mode in combination with sensing and reservation, and the terminal device autonomously selects transmission resource from SL resource. Specifically, the terminal device obtains a set of available transmission resource in a resource pool by means of sensing and then randomly selects a piece of resource for data transmission from the set of available transmission resource.

In the IoV system, other transmission modes can also be defined. For example, mode 5 indicates that the SL transmission resource of the terminal device is allocated by the base station, and mode 6 indicates that the terminal device autonomously selects the SL transmission resource. Embodiments of the present disclosure are not limited thereto.

D2D communication may include vehicle to vehicle (V2V) communication or vehicle to everything (V2X) communication. In V2X communication, X may generally refer to any device with wireless receiving and sending capabilities, including but not limited to slow-moving wireless devices, fast-moving vehicle-mounted devices, or network control nodes with wireless transmitting and receiving capabilities. It should be understood that the embodiments of the present disclosure are generally applied to the scenario of V2X communication but can also be applied to any other D2D communication scenario, which is not limited to the embodiments of the present disclosure.

Figure 2:
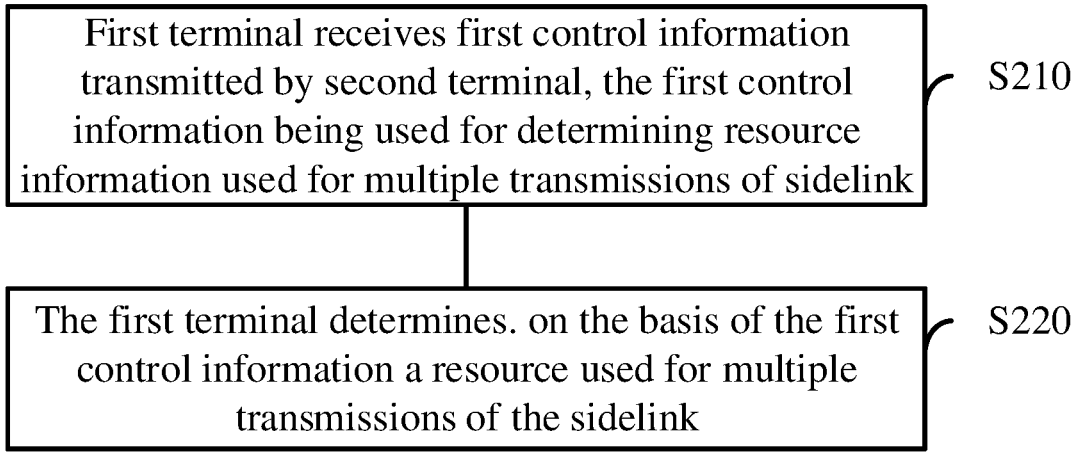
FIG. 2 is a schematic diagram illustrating a method for transmitting data in IoV provided according to an embodiment of the present disclosure.

FIG. 2 is a schematic flowchart illustrating a method for transmitting data in IoV according to an embodiment of the present disclosure. The method may be performed by a terminal device in an IoV system, such as the terminal device 121 or the terminal device 122. As shown in FIG. 2, the method 200 includes the following steps.

In S210, the first terminal receives first control information sent by the second terminal, where the first control information is used for determining resource information used for multiple SL transmissions.

In S220, the first terminal determines resource used for multiple SL transmissions according to the first control information.

Specifically, the first terminal may receive the first control information sent by the second terminal. Optionally, the first control information may be SCI or other SL information, which is not limited in the embodiments of the present disclosure. The first control information may be used by the first terminal to determine resource used for multiple SL transmissions. For example, the first control information may directly or indirectly indicate resource used for the multiple transmissions, so that the first terminal can determine the resource used for multiple SL transmissions according to the first control information.

It should be noted that the embodiments of the present disclosure can be applied to the following two exemplary cases.

In the first case, the first terminal determines the resource used for multiple SL transmissions according to the first control information and may further receive data sent by the second terminal multiple times on the resource. Optionally, the first terminal may receive the same data sent by the second terminal device multiple times on the resource, thereby improving the reliability of data transmission on the SL.

In the second case, the first terminal determines the resource used for multiple SL transmissions according to the first control information and may further send SL data multiple times to other terminals (e.g., the second terminal) on the resource. Optionally, the first terminal may send the same data multiple times to other terminals (e.g., the second terminal) on the resource, thereby improving the reliability of data transmission on the SL.

In other words, the resource used for multiple SL transmissions may be the resource used by the first terminal to send SL data multiple times to the second terminal. In this case, for the first terminal, the resource can be regarded as a sending resource. Alternatively, it may be the resource used by the second terminal to send SL data to the first terminal multiple times. In this case, for the first terminal, the resource can be regarded as a receiving resource. The following takes the above first case as an example for illustration. The embodiments in the present disclosure can also be applied to the second case, but the detailed description is omitted for brevity.

Optionally, the resource information described in the embodiments of the present disclosure may include time-domain resource information and/or frequency-domain resource information or may also include other resource information used in SL transmission, such as code-domain resource information and the like. The embodiments of the present disclosure are not limited thereto.

It should be understood that the resource described in the embodiments of the present disclosure may also be referred to as transmission resource or time-frequency resource and may be used for carrying data or signaling during SL communication. For example, the resource may be used for multiple transmissions of physical SL control channel (PSCCH) or physical SL shared channel (PSSCH).

It should be understood that in the embodiment of the present disclosure, the first terminal may determine a group of resource according to the first control information, and the group of resource may be used for each transmission in the multiple transmissions, that is, each transmission uses the same resource. Alternatively, the first terminal may also determine multiple groups of resources according to the first control information. Each group of resource corresponds to one transmission, and each transmission uses its corresponding resource. The frequency-domain resource used for each transmission may be the same or different, which is not limited in the embodiments of the present disclosure.

Optionally, in some embodiments, if only the time-domain resource information used for the multiple transmissions can be determined according to the first control information, in this case, the frequency-domain resource used for the multiple transmissions may be implicitly determined. For example, the first terminal may use a fixed frequency-domain resource. The fixed frequency-domain resource may be pre-configured at the first terminal, for example, configured in advance by a network device or other terminal devices, and the first terminal only needs to be notified in advance of the available frequency-domain resource. Alternatively, the frequency-domain resource that the first terminal can use may have a one-to-one correspondence relationship with the frequency-domain resource of the first control information, so that the available frequency-domain resource can be determined according to the frequency-domain resource for receiving the first control information. For example, the frequency-domain resource that the first terminal can use is the same as the frequency-domain resource of the first control information, and then the first terminal may determine the frequency-domain resource for receiving the first control information as the frequency-domain resource used for the multiple transmissions.

Alternatively, in some other embodiments, if only the frequency-domain resource information used for the multiple transmissions can be determined based on the first control information, in this case, the time-domain resource used for the multiple transmissions may be implicitly determined. For example, the first terminal may use a fixed time-domain resource. The fixed time-domain resource may be pre-configured, for example, configured by a network device or other terminal devices, and the first terminal only needs to be notified in advance of the available time-domain resource. Alternatively, there is a one-to-one correspondence between the time-domain resource that the first terminal can use and the time-domain resource for receiving the first control information. In this way, it is possible to determine the available time-domain resource according to the time-domain resource for receiving the first control information. For example, the first terminal may determine the s*T-th time unit after the time unit for receiving the first control information as the time-domain resource used for the multiple transmissions. Optionally, T may be 2, 4, 8, and the like, $1<=s<=M$, where M represents the total number of the multiple transmissions.

In other words, if only part of the resource information used for multiple SL transmissions can be determined according to the first control information, the remaining resource information can be implicitly determined. For example, the remaining resource information can be pre-configured at the first terminal, or pre-configured by the network device or other terminal devices or may also have correspondence with known resource information (e.g., frequency-domain resource or time-domain resource for receiving the first control information), and the like. The embodiments of the present disclosure are not limited thereto.

In the following, the methods for determining time-domain resource and frequency-domain resource for multiple SL transmissions are respectively described in conjunction with specific embodiments.

1. The Method for Determining the Time-Domain Resource Used for Multiple SL Transmissions.

It should be understood that in the embodiments of the present disclosure, the unit of time-domain resource may be referred to as a time unit or a time-domain unit, wherein the time unit may be a time slot, a symbol, a subframe, a short transmission time interval (sTTI), or other quantities that can be used for measuring the length of time, which is not limited in the present disclosure. The following embodiments are mainly described by taking the subframe as examples, which should not constitute any limitation to the embodiments of the present disclosure.

Embodiment I

The first control information includes a first bitmap, the first bitmap is used for determining the time-domain resource of multiple SL transmissions, and each bit in the first bitmap corresponds to at least one time unit in the system, and a value of each bit in the first bitmap is used for determining whether the time unit corresponding to each bit can be used for SL transmission.

Optionally, if the first bitmap includes P bits, where P is an integer greater than 1, and each bit corresponds to at least one time unit, the value of the bit can be used for determining whether its corresponding time unit can be used for SL transmission. In this way, the first terminal can determine the time unit that can be used for SL transmission among the time units corresponding to the P bits as the time unit for the multiple SL transmissions, and further receive the data over these time units sent by the second terminal multiple times on the SL, so that the reliability of the SL transmission can be improved.

For example, the first bitmap includes 8 bits, each bit corresponds to a subframe, and the 8 bits can indicate whether the corresponding 8 subframes can be used for SL transmission. Optionally, the 8 subframes may be 8 subframes starting from the current subframe where the first control information is received, with the highest bit corresponding to the current subframe, and so on. If the first bitmap is 10100101, it can be determined that the first, third, sixth, and eighth subframes from the current subframe can be used for SL transmission, so that the first terminal can receive the SL data on the above available subframes sent by the second terminal multiple times, thereby improving the reliability of data transmission.

It should be understood that in the embodiments of the present disclosure, after determining which subframes are used for SL transmission, the specific symbols in each subframe used for transmitting SL data may be determined according to the configuration of a resource pool, which is not limited in the embodiments of the present disclosure. For example, if the first H symbols in a subframe are used for transmitting PSCCH, and the remaining symbols are used for transmitting PSSCH, the first terminal may transmit PSCCH on the first H symbols in the available subframe and transmit PSSCH on the remaining symbols in the available subframe.

It should be noted that the time unit corresponding to each bit in the first bitmap may be relative to the first time unit. Optionally, the first time unit may be the initial time unit in the radio frame or the initial time unit in the radio frame period. Alternatively, the first time unit may also be a time unit pre-configured at the first terminal or a time unit configured by the network device or other terminals. For example, the network device may configure the first time unit through DCI, and other terminals may configure the first time unit through SCI. Alternatively, the first time unit may be determined according to a second time unit that carries the first control information.

It should be understood that, in the embodiments of the present disclosure, the subframe, radio frame, or radio frame period may refer to the subframe, radio frame or radio frame period of downlink, or refer to the subframe, radio frame or radio frame period of SL.

For example, the second time unit may be a time unit on the SL through which the first terminal receives the first control information. In an implementation manner, the first terminal may determine the second time unit as the first time unit or determine the a-th SL time unit after the second time unit as the first time unit, where a is an integer greater than 1, and optionally, a may be 2, 4, 8, and the like. For example, if the second time unit is subframe n, the first time unit may be subframe n+4. In an embodiment, the parameter a may be pre-configured, or configured by the network, or indicated by the second terminal or other terminals through control signaling.

Embodiment II

The first control information includes first configuration information, and the first configuration information is used for determining a time offset between two adjacent transmissions in the multiple transmissions.

Optionally, the first configuration information may directly indicate the time offset between two adjacent transmissions. Alternatively, the first configuration information may also be an index value, and a corresponding time offset may be determined based on the index value and a pre-configured correspondence relationship between index values and time offsets. Embodiments of the present disclosure do not limit the indication manner of the first configuration information.

Therefore, according to the first configuration information in the first control information, the first terminal can determine the time offset between two adjacent transmissions in multiple transmissions and, further, determine the time-domain resource corresponding to each transmission of the multiple transmissions based on time-domain resource corresponding to the initial transmission and information on the number of transmissions.

For example, if the first configuration information indicates that the time offset is 2 time units, the number of transmissions is 4, and the time unit corresponding to the initial transmission is 4, and the time unit 4 may be relative to a third time unit. The method for determining the third time unit may refer to the aforementioned method for determining the first time unit, which will not be repeated here. If the third time unit is the current time unit where the first control information is received, the time units corresponding to the four transmissions are the 4-th, 6-th, 8-th, and 10-th time units from the current time unit, respectively.

It should be understood that in some implementation manners, the time offset between two adjacent transmissions may be determined based on the first control information. In other implementation manners, the time offset may also be implicitly determined. Optionally, the time offset may be pre-configured at the first terminal or configured by the network device or other terminals. For example, the time offset may be Q, which is an integer greater than or equal to zero. That is, multiple transmissions may use adjacent time units or may be spaced apart with a fixed number of time units or a fixed length of time.

Optionally, in some embodiments, the time-domain resource corresponding to the initial transmission may also be determined by the first control information. Alternatively, in other embodiments, the time-domain resource corresponding to the initial transmission may also be implicitly determined, for example, pre-configured at the first terminal or configured by the network device or other terminals, which is not limited in the embodiments of the present disclosure.

In an exemplary implementation, seventh configuration information may be included in the first control information, and the seventh configuration information is used for determining the time-domain resource corresponding to the initial transmission, wherein the indication manner of the seventh configuration information may refer to the first configuration information. Optionally, the seventh configuration information may also use the bitmap method described in Embodiment I to indicate the time-domain resource corresponding to the initial transmission, which is not repeated here. Alternatively, the seventh configuration information is a parameter b, which represents a time offset of the initial transmission relative to the reception of the first control information. If the first control information is received in subframe n, the time-domain resource corresponding to the initial transmission can be determined as subframe n+b. Optionally, b can be 2, 4, 8, or the like.

Optionally, in some embodiments, the number of transmissions of the multiple transmissions may also be determined by the first control information. Alternatively, in other embodiments, the number of transmissions of the multiple transmissions may also be implicitly determined. Optionally, the number of transmissions may be pre-configured at the first terminal or configured by the network device or other terminals, which is not limited in the embodiments of the present disclosure. Optionally, the transmission times of the multiple transmissions may be a default number, for example, 2 or 4.

In an exemplary implementation, eighth configuration information may be included in the first control information, and the eighth configuration information is used for determining the number of transmissions of the multiple transmissions. For example, the eighth configuration information may directly indicate the number of transmissions of the multiple transmissions.

It should be understood that in the embodiment II, if the time offset between any two adjacent transmissions is the same, the first configuration information may only include one time offset. Alternatively, if the time offset between any two adjacent transmissions is not the same, the first configuration information may also include multiple time offsets, indicating the time offsets between two adjacent transmissions in sequence according to the sequence of transmissions. For example, the number of transmissions is 4, the time offset between the initial transmission and the second transmission is 2 time units, the time offset between the second transmission and the third transmission is 3 time units, and the time offset between the third transmission and the fourth transmission is 2 time units. Accordingly, the first configuration information may include three time offsets, namely 2, 3, and 2, respectively, indicating the time offset between two adjacent transmissions between transmissions from the initial transmission to the fourth transmission.

Embodiment III

The first control information includes first index information, and the first index information is used for indicating the time-domain resource information corresponding to each transmission of the multiple transmissions.

In Embodiment III, a first correspondence is configured at the first terminal. Optionally, the first correspondence may be pre-configured or configured by the network device or other terminals, and the first correspondence is a correspondence between index values and time-domain resource. Accordingly, the first terminal can determine the time-domain resource used for multiple SL transmissions according to the first index information included in the first control information in combination with the first correspondence.

As an example, without being limited, the first correspondence may be as shown in Table 1.

TABLE 1

| Index Values | Serial No. of Subframes | Index Values | Serial No. of Subframes |
|---|---|---|---|
| 0 | 1 | 8 | 1, 2, 3, 4 |
| 1 | 2 | 9 | 5, 6, 7, 8 |
| 2 | 3 | 10 | 1, 3, 5, 7 |
| 3 | 4 | 11 | 2, 4, 6, 8 |
| 4 | 1, 2 | 12 | 1, 3, 5, 7, 9, 11, 13, 15 |
| 5 | 1, 3 | 13 | 2, 4, 6, 8, 10, 12, 14, 16 |
| 6 | 1, 4 | 14 | 1, 2, 3, 4, 5, 6, 7, 8 |
| 7 | 2, 4 | 15 | 9, 10, 11, 12, 13, 14, 15, 16 |

Optionally, in this embodiment III, the number of transmissions of the multiple transmissions may be determined by other parameters or information in the first control information or may be pre-configured or configured by the network. Alternatively, in a possible implementation manner, the number of transmissions of the multiple transmissions can be determined by the first index information, and the time-domain resource corresponding to the first index information is the time units corresponding to the multiple transmissions.

For example, if the first index information is 8, by looking up Table 1, it corresponds to the subframes with serial numbers 1, 2, 3, 4, and the index 8 indicates 4 transmissions. The serial number of the subframe can be relative to a certain time unit. The meaning and determination method of the certain time unit may refer to the first time unit in Embodiment I. Taking an example in which the certain time unit is the current subframe for receiving the first control information, the subframes corresponding to the 4 transmissions are respectively subframes 1, 2, 3, and 4 from the current subframe. If the first index information is 12, by looking up Table 1, it corresponds to 8 transmissions, and the subframes corresponding to the 8 transmissions are subframes 1, 3, 5, 7, 9, 11, 13, 15 from the current subframe.

Embodiment IV

The first control information includes the second configuration information, and the second configuration information is used for determining a time offset of each transmission of the multiple transmissions relative to a certain boundary. For example, the second configuration information may directly indicate the time offset or the number of offset time units of each transmission relative to a certain boundary. Alternatively, the second configuration information may also be multiple index values, each index value is used for indicating the time offset or the index of time unit of one corresponding transmission relative to the certain boundary, and the embodiments of the present disclosure does not specifically limit the indication manner of the second configuration information.

Further, the first terminal may use the certain boundary as a reference and determine the time-domain resource corresponding to each transmission in combination with the time offset of each transmission relative to the certain boundary.

It should be noted that the meaning and determination method of the certain boundary may refer to the first time unit in Embodiment I, which is not repeated here. In the following, an example is described in which the certain boundary is the current subframe carrying the first control information as.

If the time offset is represented by 5 bits, the maximum time offset that can be indicated is 32 subframes. If the number of transmissions is 2, the method for determining the number of transmissions may refer to Embodiment II. If the time offsets corresponding to the two transmissions are respectively 00010 and 00100, it can indicate that the time-domain resources corresponding to the two transmissions are the second subframe and the fourth subframe from the current subframe, respectively.

Optionally, the first control information may also include first indication information for indicating type information of the time-domain resource used for the multiple transmissions. For example, it indicates whether the time-domain is adjacent and, if the time-domain is adjacent, the first terminal may also determine the time-domain resource for each transmission according to a location of the time-domain resource for the initial transmission.

It should be understood that the above method for determining the time-domain resource for multiple SL transmissions is only an example and should not constitute any limitation to the embodiments of the present disclosure. The above embodiments can be used alone or in combination. For example, the location of the time-domain resource for the initial transmission can be determined according to Embodiment IV and then, the time-domain resource used for several subsequent transmissions can be determined according to Embodiment II or Embodiment I.

In summary, the time-domain resource information corresponding to the initial transmission, the time offset between two adjacent transmissions, the number of transmissions, the time offset of each transmission relative to the certain boundary, and other information can all be determined by the first control information. Alternatively, part of the information may be determined by the first control information, and the remaining information may be implicitly determined, for example, may be pre-configured or configured by the network.

It should be understood that the time-domain resource information corresponding to the initial transmission, the time offset between two adjacent transmissions, the number of transmissions, the time offset of each transmission relative to the certain boundary, and other information can be determined based on the same SCI or different SCIs, which is not limited in the embodiments of the present disclosure. For example, the time-domain resource information corresponding to the first transmission can be determined according to the first SCI, and the time offset between two adjacent transmissions can be determined according to the second SCI, and so on.

2. The Method for Determining the Frequency-Domain Resource for Multiple SL Transmissions.

It should be understood that in the embodiments of the present disclosure, the unit of frequency-domain resource may be referred to as a frequency-domain unit, wherein the frequency-domain unit may be a physical resource block (PRB), a resource block group (RBG), a subband or other frequency-domain units with a fixed length, which is not limited in the embodiments of the present disclosure, where the RBG and the subband include multiple consecutive PRBs. The following embodiments are mainly described by taking the subband as examples, which should not constitute any limitation to the embodiments of the present disclosure.

Embodiment V

The first control information includes a second bitmap, the second bitmap is used for determining the frequency-domain resource of multiple SL transmissions, and each bit in the second bitmap corresponds to at least one frequency-domain unit in the system, and a value of each bit in the second bitmap is used for determining whether the frequency-domain unit corresponding to each bit can be used for SL transmission.

Optionally, if the second bitmap includes L bits, and each bit corresponds to at least one frequency-domain unit, the value of the bit can be used for determining whether its corresponding frequency-domain unit can be used for SL transmission. Thus, the first terminal may determine the frequency-domain unit that can be used for SL transmission among the frequency-domain units corresponding to the L bits as the frequency-domain unit used for multiple SL transmissions, and further receive the SL data over these frequency-domain units sent by the second terminal multiple times, so that the reliability of the SL transmission can be improved.

For example, the second bitmap includes 10 bits, and each bit corresponds to a subband, and the 10 bits can indicate whether the corresponding 10 subbands (subband 0-subband 9) can be used for SL transmission. In an embodiment, the lowest bit corresponds to the lowest subband index. If the second bitmap is 1010101010, it can be determined that subband 1, subband 3, subband 5, subband 7, and subband 9 can be used for SL transmission. Therefore, the first terminal can receive the SL data sent by the second terminal multiple times on the above available subband.

It should be understood that in the embodiments of the present disclosure, after determining which subbands are used for SL transmission, the specific PRBs in each subband on which SL data is transmitted may be determined according to the configuration of a resource pool. For example, If the first K PRBs in a subband are used for transmitting PSCCH, and the remaining PRBs are used for transmitting PSSCH, the first terminal can transmit PSCCH on the first K PRBs in the available subbands and transmit PSSCH on the remaining PRBs in the available subbands, where K is an integer greater than or equal to 1.

Embodiment VI

The first control information includes the third configuration information, and the third configuration information is used for determining frequency-domain resource length information for each of the multiple SL transmissions.

Similar to the aforementioned first configuration information, the third configuration information may also directly indicate the frequency-domain resource length corresponding to each transmission. Alternatively, the third configuration information may also be multiple index values, and the multiple index values indicate the frequency-domain resource length of the multiple transmissions, which is not specifically limited in the embodiments of the present disclosure.

Optionally, in an embodiment of the present disclosure, the frequency-domain resource length information for each transmission may also be implicitly configured. For example, the frequency-domain resource length corresponding to each transmission may be a default length, for example, one subband or two subbands, or the like. Alternatively, the frequency-domain resource length may be pre-configured at the first terminal or may be a frequency-domain length configured by the network device or other terminals, which is not limited in the embodiments of the present disclosure.

Further, the first terminal may determine the frequency-domain resource corresponding to each transmission according to the length of the frequency-domain resource corresponding to each transmission in the multiple transmissions, and further combining with the frequency-domain start position corresponding to each transmission. The method for determining the frequency-domain start position of each transmission is described based on Examples I and II as follows.

Example I

The first control information includes the fourth configuration information, and the fourth configuration information is used for determining the frequency-domain start position of each transmission of the multiple transmissions.

In other words, by carrying the fourth configuration information in the first control information, the first terminal can determine the frequency-domain start position corresponding to each transmission according to the fourth configuration information.

Optionally, the fourth configuration information may be used for indicating an index of a starting frequency-domain unit corresponding to each transmission. For example, if the system is divided into 10 subbands, 4-bit information may be used for indicating the subband index (0-9). When the number of transmissions is 2, the frequency-domain start position of each transmission can be indicated by two pieces of 4-bits. If the 4-bit information is 0010 and 0110, respectively, it can be determined that subband 2 and subband 6 correspond to the frequency-domain start position of the two transmissions, respectively.

Further, the first terminal determines the frequency-domain resource of each transmission in the multiple transmissions according to the frequency-domain start position of each transmission in the multiple transmissions and the frequency-domain resource length information.

Following the above example, if the frequency-domain resource length of the first transmission is 2 subbands, and the frequency-domain resource length of the second transmission is 1 subband, the first terminal can perform the first transmission on subband 2 and subband 3 and perform the second transmission on subband 6. Alternatively, the first transmission may be performed on the subband 6 and the subband 7, while the second transmission is performed on the subband 2.

Optionally, the first control information may also include a first parameter, which is used for indicating that the lowest frequency-domain start position (or the lowest frequency-domain unit, which may be understood as the frequency-domain unit with the smallest subband index) corresponds to the m-th transmission in the multiple transmissions, where $1 \leq m \leq M$, and M is the total number of transmissions. Thus, the remaining M−1 transmissions in the multiple transmissions can also be determined in sequence.

Following the above example, if the first parameter indicates that subband 2 corresponds to the second transmission. Accordingly, subband 6 corresponds to the first transmission. In other words, the frequency-domain start position of the first transmission is subband 6, and the frequency-domain start position of the second transmission is subband 2, so that the first terminal can perform the first transmission on subband 6 and subband 7 and perform the second transmission on subband 2.

Optionally, in some embodiments, the first parameter may also be used for indicating which of the multiple transmissions corresponds to the highest frequency-domain start position, or it may indicate which of the multiple transmissions corresponds to any one of the frequency-domain start positions. The specific implementation is similar and will not be repeated here.

Example II

The first control information includes a third bitmap, each bit in the third bitmap corresponds to at least one frequency-domain unit in the system, the number of bits having a first value in the third bitmap is used for determining the number of transmissions of the multiple transmissions, and the frequency-domain units corresponding to the bits having the first value in the third bitmap are used for determining the frequency-domain start position of each transmission in the multiple transmissions.

Optionally, the first value may be 0 or 1. The following description is provided by taking an example in which the first value is 1.

For example, the system bandwidth is 20 MHz, and each subband includes 10 PRBs. Then 10 subbands are included, corresponding to 10 bits of the third bitmap. If the third bitmap is 00 0010 0100, where the lowest bit corresponds to the lowest subband index. Thus, the number of bits with a value of 1 is 2, it can be determined that the number of transmissions is 2, and the corresponding frequency-domain start positions are subband 2 and subband 5.

Since the bit order in the third bitmap is arranged in the order of subband index from low to high, this limits the frequency-domain start position of multiple transmissions to the order of subband index from low to high. To improve the flexibility of SL transmission, the first control information may also include a second parameter, which is used for indicating that the lowest frequency-domain start position (or the lowest frequency-domain unit, which can be understood as the frequency-domain unit with the smallest index) corresponds to the k-th transmission in the multiple transmissions, where $1 \leq k \leq M$, and M is the total number of transmissions. In this way, the remaining M−1 transmissions in the multiple transmissions can be determined in sequence.

In the previous example, the second parameter may be 1 bit. If the second parameter taking a value of 0 indicates that the lowest subband corresponds to the first transmission and taking a value of 1 indicates that the lowest subband corresponds to the second transmission. Then, if the second parameter is 1, it can be determined that the second transmission starts from subband 2, and the first transmission starts from subband 6. Alternatively, if the third bitmap is 0010101010, that is, the number of transmissions is 4, and the frequency-domain start positions are subband 1, subband 3, subband 5, and subband 7. In this case, the second parameter may include 2 bits, and its value of 00-11 indicates that the lowest subband corresponds to the first transmission to the fourth transmission, respectively. If the second parameter is 10, it indicates that the lowest subband corresponds to the third transmission. Then it can be determined that the frequency-domain start positions corresponding to the four transmissions are subband 5, subband 7, subband 1, and subband 3.

Embodiment VII

The first control information includes the fifth configuration information, and the fifth configuration information is used for determining a frequency-domain start position offset between two adjacent transmissions in the multiple transmissions. Optionally, the fifth configuration information may directly indicate the frequency-domain start position offset between two adjacent transmissions, or the first configuration information may also be an index value. A corresponding frequency-domain offset can be determined according to the index value and correspondence between index values and frequency-domain offsets. The embodiments of the present disclosure will not limit the indication manner of the fifth configuration information.

Therefore, according to the fifth configuration information in the first control information, the first terminal can determine the frequency-domain start position offset between two adjacent transmissions in the multiple transmissions, and further, in combination with a frequency-domain start position corresponding to the first transmission, the number of transmissions of the multiple transmissions, and the frequency-domain resource length of each transmission, the first terminal can determine the frequency-domain resource corresponding to each transmission of the multiple transmissions.

For example, if the fifth configuration information indicates that the frequency-domain offset is 4 subbands, the number of transmissions is 4, the frequency-domain start position corresponding to the first transmission is subband 2, and the frequency-domain length is 2 subbands, then the frequency-domain start positions corresponding to four transmissions are subband 2, subband 6, subband 10, and subband 14, and each transmission occupies 2 subbands.

Optionally, the frequency-domain start position corresponding to the first transmission may be determined by the first control information, or the frequency-domain start position corresponding to the first transmission may also be implicitly determined, for example, pre-configured at the first terminal, or configured by the network device or other terminals, or determined according to the receiving resource of the first control information, which is not limited in the embodiments of the present disclosure. An exemplary implementation may refer to the indication manner of the seventh configuration information in the foregoing embodiment, and details are not described here.

It should be noted that in the Embodiment VII, if the frequency-domain start position offsets between any two adjacent transmissions are the same, the fifth configuration information may include only one frequency-domain offset. Alternatively, if the frequency-domain offsets between any two adjacent transmissions in the multiple transmissions are different, the fifth configuration information may also include multiple frequency-domain offsets, indicating the frequency-domain start position offset between two adjacent transmissions in sequence according to the order of transmissions. For example, the number of transmissions is 4, the frequency-domain start position offset between the first transmission and the second transmission is 2 subbands, the frequency-domain start position offset between the second transmission and the third transmission is 3 subbands, and the frequency-domain start position offset between the third transmission and the fourth transmission is 2 subbands, the fifth configuration information may include three frequency-domains offsets, that is 2, 3, and 2, respectively indicating the frequency-domain start position offset between two adjacent transmissions from the first transmission to the fourth transmission.

Embodiment VIII

The first control information may include the sixth configuration information, the sixth configuration information includes N resource indication values (RIVs), and the N RIVs are used for determining the frequency-domain start position and/or the frequency-domain length of the multiple transmissions.

For example, the RIV may correspond to a starting PRB index (n_PRB_start) of one transmission and the number of consecutive PRBs (L_PRB). As an example, without limitation, the RIV may be determined according to the following formula.

If $L\_PRB-1 \le [N\_PRB/2]$, then:

$RIV=N\_PRB*(L\_PRB-1)+n\_PRB\_start$;

Otherwise, $RIV=N\_PRB*(N\_PRB-L\_PRB+1)+(N\_PRB-n\_PRB\_start-1)$, where N_PRB represents the total number of PRBs in the resource pool.

Optionally, in some embodiments, the first control information includes an RIV value, and the RIV value is used for indicating the frequency-domain start position and the frequency-domain resource length of the first transmission.

In this case, the first control information also includes ninth configuration information, which is used for determining the frequency-domain start positions of the multiple transmissions. For example, the ninth configuration information may indicate the frequency-domain start position offset between two adjacent transmissions, or the frequency-domain start positions of the remaining M-1 transmissions other than the first transmission, or the like. An exemplary implementation may refer to the relevant description of the foregoing embodiments, which will not be repeated here.

Based on the above embodiments, the frequency-domain start position corresponding to the first transmission, the frequency-domain start position offset between two adjacent transmissions, the frequency-domain resource length, the number of transmissions, and the like can all be controlled by the first control information. Alternatively, part of the foregoing information may be determined by the first control information, while the remaining information may be determined implicitly. For example, it may be pre-configured information, information configured by network, or determined by other control information.

It should also be understood that the frequency-domain start position corresponding to the first transmission, the frequency-domain start position offset between the two adjacent transmissions, the frequency-domain resource length, the number of transmissions, and other information can be determined based on the same SCI, or determined according to different SCIs, which is not limited in the embodiments of the present disclosure. For example, the frequency-domain start position may be determined according to a third SCI, while the frequency-domain resource length may be determined according to a fourth SCI.

It should be understood that the above method for determining frequency-domain resource for multiple SL transmissions is only exemplary and should not constitute any limitation to the embodiments of the present disclosure. The above embodiments can be implemented alone or in combination, which is not specifically limited in the embodiments of the present disclosure.

The method embodiments of the present disclosure are described in detail above with reference to FIG. 2, and the device embodiments of the present disclosure will be described below with reference to FIG. 3 to FIG. 5. It should be understood that the device embodiments and the method embodiments correspond to each other, and similar descriptions may refer to the method embodiments.

Figure 3:
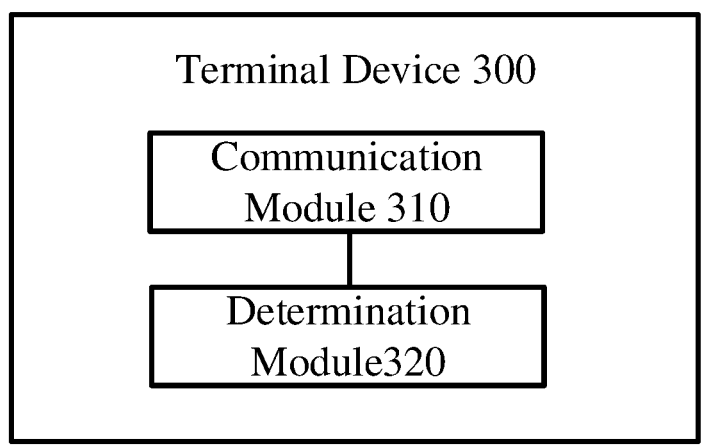
FIG. 3 is a block diagram illustrating a terminal device according to an embodiment of the present disclosure.

FIG. 3 is a block diagram illustrating a terminal device according to an embodiment of the present disclosure. As shown in FIG. 3, the terminal device 300 includes a communication module 310 configured to receive first control information sent by a second terminal. The first control information is used for determining resource information used for multiple sidelink (SL) transmissions. The terminal device 300 also includes a determination module 320 configured to determine, according to the first control information, resource used for the multiple SL transmissions.

Optionally, in an embodiment, the resource information used for multiple SL transmissions includes time-domain resource information and/or frequency-domain resource information used for the multiple SL transmissions.

Optionally, in an embodiment, the first control information includes a first bitmap, the first bitmap being used for determining time-domain resource for the multiple SL transmissions, wherein each bit in the first bitmap corresponds to at least one time unit in a system, a value of the each bit in the first bitmap is used for determining whether the time unit corresponding to the each bit can be used for SL transmission, and the determination module is specifically configured to determine, among the time units corresponding to the each bit in the first bitmap, a time unit that can be used for SL transmission as time-domain resource used for the multiple SL transmissions.

Optionally, in an embodiment, the first control information includes first configuration information, the first configuration information being used for determining a time offset between two adjacent transmissions in the multiple transmissions, and the determination module is further configured to determine, according to time-domain resource information for an initial transmission of the multiple transmissions, a number of transmissions of the multiple transmissions, and the time offset between two adjacent transmissions, time-domain resource used for each transmission of the multiple transmissions.

Optionally, in an embodiment, the time-domain resource information for the initial transmission is determined according to the first control information, or is pre-configured at the terminal device, or is configured by a network device. Information about the number of transmissions is determined according to the first control information, or is pre-configured at the terminal device, or is configured by the network device.

Optionally, in an embodiment, the first control information includes first index information, the first index information being used for indicating time-domain resource information corresponding to each transmission of the multiple transmissions.

Optionally, in an embodiment, the determination module is further configured to determine, according to the first index information and a first correspondence, time-domain resource used for the multiple transmissions. The first correspondence is a correspondence between index information and time-domain resource information.

Optionally, in an embodiment, the determination module is further configured to determine, according to the first index information, a number of transmissions of the multiple transmissions. Time-domain resource corresponding to the first index information is a time unit used for the multiple transmissions.

Optionally, in an embodiment, the first control information includes second configuration information, the second configuration information being used for determining a time offset of each transmission of the multiple transmissions relative to a certain boundary, and the determination module is further configured to determine, according to the time offset of the each transmission relative to the certain boundary with the certain boundary as a reference, time-domain resource used for the each transmission.

Optionally, in an embodiment, the certain boundary is a time unit determined according to a time unit carrying the first control information, or an initial time unit of a current radio frame, or an initial time unit of a current radio frame period.

Optionally, in an embodiment, the first control information includes a second bitmap, the second bitmap being used for determining frequency-domain resource for the multiple SL transmissions, wherein each bit in the second bitmap corresponds to at least one frequency-domain unit in a system, and a value of the each bit in the second bitmap is used for determining whether the frequency-domain unit corresponding to the each bit can be used for SL transmission.

Optionally, in an embodiment, the determination module is further configured to determine, among the frequency-domain units corresponding to the each bit in the second bitmap, a frequency-domain unit that can be used for SL transmission as frequency-domain resource used for the multiple SL transmissions.

Optionally, in an embodiment, the first control information includes third configuration information, the third configuration information being used for determining length information of frequency-domain resource for each transmission of the multiple SL transmissions.

Optionally, in an embodiment, the first control information includes fourth configuration information, the fourth configuration information being used for determining a frequency-domain start position for each transmission of the multiple transmissions, and the determination module is further configured to determine the length information of frequency-domain resource for each transmission of the multiple SL transmissions according to the third configuration information, and determine the frequency-domain start position for each transmission of the multiple transmissions according to the fourth configuration information; and determine, according to the frequency-domain start position and the length information of frequency-domain resource for each transmission of the multiple transmissions, the frequency-domain resource for the each transmission of the multiple transmissions.

Optionally, in an embodiment, the first control information includes a third bitmap, each bit in the third bitmap corresponds to at least one frequency-domain unit in a system, a number of bits having a first value in the third bitmap is used for determining a number of transmissions of the multiple transmissions, and a frequency-domain unit corresponding to the bits having the first value in the third bitmap is used for determining the frequency-domain start position of each transmission in the multiple transmissions.

Optionally, in an embodiment, the determination module is further configured to determine, according to the third configuration information, the length information of frequency-domain resource for each transmission of the multiple SL transmissions; determine the number of bits having the first value in the third bitmap as the number of transmissions of the multiple transmissions, and determine the frequency-domain unit corresponding to the bits having the first value in the third bitmap as the frequency-domain start position of each transmission in the multiple transmissions; and determine, according to the number of transmissions of the multiple transmissions, the frequency-domain start position and the length information of frequency-domain resource of each transmission in the multiple transmissions, the frequency-domain resource for each transmission of the multiple transmissions.

Optionally, in an embodiment, the first control information includes fifth configuration information, the fifth configuration information being used for determining a frequency-domain start position offset between two adjacent transmissions in the multiple transmissions, and the determination module is further configured to determining, by the first terminal according to a frequency-domain start position of an initial transmission in the multiple transmissions, the number of transmissions of the multiple transmissions, and the frequency-domain start position offset between the two adjacent transmissions, the frequency-domain resource for each transmission of the multiple transmissions.

Optionally, in an embodiment, the frequency-domain start position of the initial transmission is determined according to the first control information, or is pre-configured at the terminal device, or is configured by a network device. The information about the number of transmissions is determined according to the first control information, or is pre-configured at the terminal device, or is configured by the network device.

Optionally, in an embodiment, the first control information includes sixth configuration information, the sixth configuration information includes N resource indicator values (RIVs). The N RIVs are used for determining a frequency-domain start position and/or a frequency-domain length of the multiple transmissions, and the determination module is further configured to determine, according to the N RIVs, frequency-domain resource of the multiple transmissions, where N is a total number of the multiple transmissions.

Optionally, in an embodiment, the first control information is sidelink control information (SCI), and the SL includes a physical sidelink control channel (PSCCH) and/or a physical sidelink shared channel (PSSCH).

Figure 4:
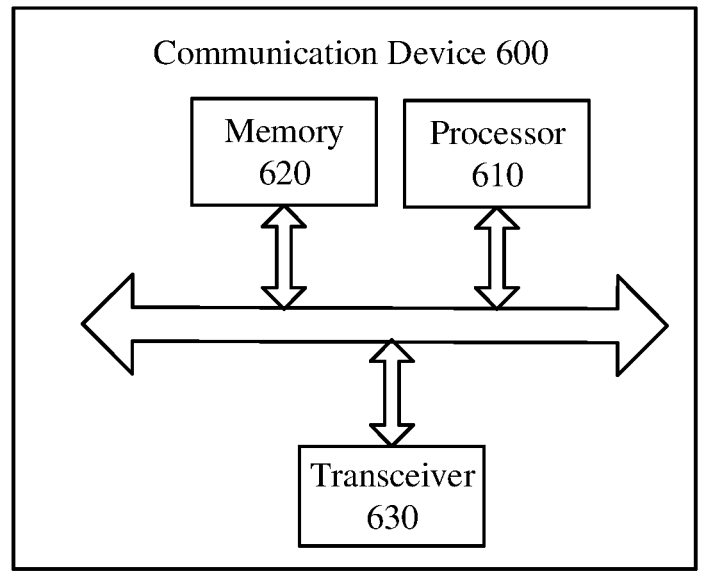
FIG. 4 is a block diagram illustrating a terminal device according to another embodiment of the present disclosure.

FIG. 4 is a schematic structural diagram of a communication device 600 provided by an embodiment of the present disclosure. The communication device 600 shown in FIG. 4 includes a processor 610, and the processor 610 can call and run a computer program from a memory to implement the method in the embodiment of the present disclosure.

Optionally, as shown in FIG. 4, the communication device 600 may further include a memory 620. The processor 610 may call and run a computer program from the memory 620 to implement the method in the embodiment of the present disclosure.

The memory 620 may be a separate device independent of the processor 610 or may be integrated into the processor 610.

Optionally, as shown in FIG. 4, the communication device 600 may further include a transceiver 630, and the processor 610 may control the transceiver 630 to communicate with other devices. Specifically, it may send information or data to other devices, or receive information or data sent by the other devices.

The transceiver 630 may include a transmitter and a receiver. The transceiver 630 may further include an antenna, and the number of antennas may be one or more.

Optionally, the communication device 600 may specifically be a mobile terminal/terminal device according to the embodiments of the present disclosure, and the communication device 600 may implement the corresponding processes implemented by the mobile terminal/terminal device in the method according to each embodiment of the present disclosure, which will not be repeated here for the sake of brevity.

Figure 5:
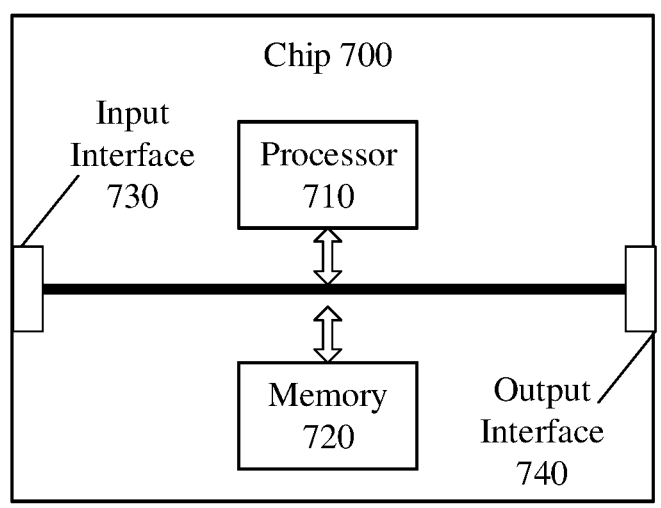
FIG. 5 is a block diagram illustrating a chip according to an embodiment of the present disclosure.

FIG. 5 is a block diagram illustrating a chip according to an embodiment of the present disclosure. The chip 700 shown in FIG. 5 includes a processor 710, and the processor 710 can call and run a computer program from the memory to implement the method according to the embodiments of the present disclosure.

Optionally, as shown in FIG. 5, the chip 700 may further include a memory 720. In an embodiment, the processor 710 may call and run a computer program from the memory 720 to implement the method according to the embodiments of the present disclosure.

In an embodiment, the memory 720 may be a separate device independent of the processor 710 or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 can control the output interface 740 to communicate with other devices or chips, and specifically, can output information or data to other devices or chips.

Optionally, the chip can be applied to the mobile terminal/terminal device according to the embodiments of the present disclosure, and the chip can implement the corresponding process implemented by the mobile terminal/terminal device in the method according to each embodiment of the present disclosure, which will not be repeated here for brevity.

It should be understood that the chip mentioned in the embodiment of the present disclosure may also be referred to as a system-level chip, a system chip, a chip system, a system-on-chip, or the like.

It should be understood that the processor, according to the embodiments of the present disclosure may be an integrated circuit chip with signal processing capability. In the implementation process, the steps of the foregoing method embodiments can be completed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programming logic devices, discrete gates or transistor logic devices, discrete hardware components. The methods, steps, and logical block diagrams disclosed in the embodiments of the present disclosure can be implemented or executed thereby. The general-purpose processor may be a microprocessor or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module can be located in a mature storage medium such as random access memory, flash memory, read-only memory, programmable read-only memory, or electrically erasable programmable memory, registers. The storage medium may be located in the memory, and the processor reads the information in the memory and completes the steps of the above method in combination with its hardware.

It can be understood that the memory in the embodiment of the present disclosure may be a volatile memory or a non-volatile memory or may include both volatile and non-volatile memory. In an embodiment, the non-volatile memory may be read-only memory (ROM), programmable ROM (PROM), erasable PROM (EPROM), and electrically EPROM (EEPROM) or flash memory. The volatile memory may be a random access memory (RAM), which is used as an external cache. By way of exemplary description without limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM)) and direct Rambus RAM (DR RAM). It should be noted that the memories of the systems and methods described herein are intended to include, but are not limited to, these and any other suitable types of memories.

It should be understood that the foregoing memory is exemplary but not restrictive. For example, the memory in the embodiment of the present disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM) direct Rambus RAM (DR RAM), and the like. That is to say, the memory in the embodiments of the present disclosure is intended to include but not limited to these and any other suitable types of memory.

The embodiment of the present disclosure also provides a computer-readable storage medium for storing computer programs.

Optionally, the computer-readable storage medium may be applied to the network device in the embodiment of the present disclosure, and the computer program causes the computer to execute the corresponding process implemented by the network device in the method according to each embodiment of the present disclosure, which will not be repeated for brevity.

Optionally, the computer-readable storage medium can be applied to the mobile terminal/terminal device in the embodiments of the present disclosure, and the computer program enables the computer to execute the corresponding process implemented by the mobile terminal/terminal device in the method according to each embodiment of the present disclosure, which will not be repeated for brevity.

The embodiments of the present disclosure also provide a computer program product, including computer program instructions.

Optionally, the computer program product may be applied to the network device in the embodiments of the present disclosure, and the computer program instructions cause the computer to execute the corresponding process implemented by the network device in the method according to each embodiment of the present disclosure, which will not be repeated for brevity.

Optionally, the computer program product can be applied to the mobile terminal/terminal device in the embodiments of the present disclosure, and the computer program instructions cause the computer to execute the corresponding process implemented by the mobile terminal/terminal device in the method according to each embodiment of the present disclosure, which will not be repeated for brevity.

The embodiment of the present disclosure also provides a computer program.

Optionally, the computer program can be applied to the network device in the embodiments of the present disclosure. When the computer program runs on the computer, the computer is caused to execute the corresponding process implemented by the network device in the method according to each embodiment of the present disclosure, which will not be repeated for brevity.

Optionally, the computer program can be applied to the mobile terminal/terminal device in the embodiments of the present disclosure. When the computer program runs on the computer, the computer is caused to execute the corresponding process implemented by the mobile terminal/terminal device in the method according to each embodiment of the present disclosure, which will not be repeated for brevity.

It may be understood by those skilled in the art that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Those skilled in the art can use different methods for each specific application to implement the described functions, but such implementation should not be considered beyond the scope of the present disclosure.

Those skilled in the art can clearly understand that, for the convenience and conciseness of description, the specific working process of the above-described system, device, and unit can refer to the corresponding process in the foregoing method embodiments, which will not be repeated here.

In the several embodiments provided in the present disclosure, it should be understood that the disclosed system, device, and method may be implemented in other ways. For example, the device embodiments described above are only illustrative. For example, the division of the units is only a logical function division, and there may be other divisions in actual implementation, for example, multiple units or components can be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or they may be distributed on multiple network units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the existing technology or the part of the technical solution can be embodied in the form of a software product, and the computer software product may be stored in a storage medium, including several instructions causing a computer device (which may be a personal computer, a server, or a network device, etc.) to execute all or part of the steps of the methods described in the various embodiments of the present disclosure. The aforementioned storage media include U disk, mobile hard disk, read-only memory (ROM), random access memory (RAM), magnetic disks or optical disks and other media that can store program codes.

The above are only specific implementations of the present disclosure, but the protection scope of the present disclosure is not limited to this. Any person skilled in the art can easily think of changes or substitutions within the technical scope disclosed in the present disclosure. Should be covered within the scope of protection of the present disclosure. Therefore, the protection scope of the present disclosure shall be subject to the protection scope of the claims.

What is claimed is:

1. A method for data transmission in Internet of vehicles (IoV), comprising:
   receiving, by a first terminal, first control information sent by a second terminal, the first control information being used for determining resource information used for multiple sidelink (SL) transmissions; and
   determining, by the first terminal according to the first control information, resource used for the multiple SL transmissions,
   wherein the resource information used for multiple SL transmissions comprises time-domain resource information and/or frequency-domain resource information used for the multiple SL transmissions;
   wherein the first control information comprises first index information, the first index information being used for indicating time-domain resource information corresponding to each transmission of the multiple SL transmissions;
   wherein the determining, by the first terminal according to the first control information, resource used for the multiple SL transmissions comprises: determining, by the first terminal according to the first index information and a first correspondence, time-domain resource used for the multiple SL transmissions, the first correspondence being a correspondence between index information and time-domain resource information; and the method further comprises:

determining, by first terminal according to the first index information, a number of transmissions of the multiple SL transmissions, wherein time-domain resource corresponding to the first index information is a time unit used for the multiple SL transmissions.

2. The method according to claim 1, wherein the first control information comprises second configuration information, the second configuration information being used for determining a time offset of each transmission of the multiple SL transmissions relative to a certain boundary, and the determining, by the first terminal according to the first control information, resource used for the multiple SL transmissions comprises:

determining, by the first terminal according to the time offset of each transmission relative to the certain boundary with the certain boundary as a reference, time-domain resource used for each transmission of the multiple SL transmissions.

3. The method according to claim 2, wherein the certain boundary is a time unit determined according to a time unit carrying the first control information, or an initial time unit of a current radio frame, or an initial time unit of a current radio frame period.

4. The method according to claim 1, wherein the first control information comprises third configuration information, the third configuration information being used for determining length information of a frequency-domain resource for each transmission of the multiple SL transmissions.

5. The method according to claim 4, wherein the first control information comprises fourth configuration information, the fourth configuration information being used for determining a frequency-domain start position for each transmission of the multiple SL transmissions, and the determining, by the first terminal according to the first control information, resource used for the multiple SL transmissions comprises:

determining, by the first terminal, the length information of the frequency-domain resource for each transmission of the multiple SL transmissions according to the third configuration information, and the frequency-domain start position for each transmission of the multiple SL transmissions according to the fourth configuration information; and determining, by the first terminal according to the frequency-domain start position and the length information of the frequency-domain resource for each transmission of the multiple SL transmissions, the frequency-domain resource for each transmission of the multiple SL transmissions.

6. The method according to claim 1, wherein the first control information is sidelink control information (SCI), and the SL comprises a physical sidelink control channel (PSCCH) and/or a physical sidelink shared channel (PSSCH).

7. A terminal device, comprising:

a processor; and a memory storing instructions, which when executed by the processor, cause the processor to:

receive first control information sent by a second terminal, the first control information being used for determining resource information used for multiple sidelink (SL) transmissions; and determine, according to the first control information, resource used for the multiple SL transmissions, wherein the resource information used for multiple SL transmissions comprises time-domain resource information and/or frequency-domain resource information used for the multiple SL transmissions;

wherein the first control information comprises first index information, the first index information being used for indicating time-domain resource information corresponding to each transmission of the multiple SL transmissions; and wherein the memory storing instructions, which when executed by the processor, further cause the processor to:

determine, according to the first index information and a first correspondence, time-domain resource used for the multiple SL transmissions, the first correspondence being a correspondence between index information and time-domain resource information; and determine, according to the first index information, a number of transmissions of the multiple SL transmissions, wherein time-domain resource corresponding to the first index information is a time unit used for the multiple SL transmissions.

8. The terminal device according to claim 7, wherein:

the first control information comprises second configuration information, the second configuration information being used for determining a time offset of each transmission of the multiple SL transmissions relative to a certain boundary, and the memory storing instructions, which when executed by the processor, further cause the processor to:

determine, according to the time offset of each transmission relative to the certain boundary with the certain boundary as a reference, time-domain resource used for each transmission of the multiple SL transmissions.

9. The terminal device according to claim 8, wherein the certain boundary is a time unit determined according to a time unit carrying the first control information, or an initial time unit of a current radio frame, or an initial time unit of a current radio frame period.

10. The terminal device according to claim 7, wherein the first control information comprises third configuration information, the third configuration information being used for determining length information of a frequency-domain resource for each transmission of the multiple SL transmissions.

11. The terminal device according to claim 10, wherein:

the first control information comprises fourth configuration information, the fourth configuration information being used for determining a frequency-domain start position for each transmission of the multiple SL transmissions, and the memory storing instructions, which when executed by the processor, further cause the processor to:

determine the length information of the frequency-domain resource for each transmission of the multiple SL transmissions according to the third configuration information, and the frequency-domain start position for each transmission of the multiple SL transmissions according to the fourth configuration information; and determine, according to the frequency-domain start position and the length information of the frequency-domain resource for each transmission of the multiple SL transmissions, the frequency-domain resource for each transmission of the multiple SL transmissions.

12. A non-transitory computer-readable storage medium storing a computer program that causes a terminal device to perform a method for data transmission in Internet of vehicles (IoV), the method comprising:
receiving first control information sent by a second terminal, the first control information being used for determining resource information used for multiple sidelink (SL) transmissions; and
determining, according to the first control information, resource used for the multiple SL transmissions,
wherein the resource information used for multiple SL transmissions comprises time-domain resource information and/or frequency-domain resource information used for the multiple SL transmissions;
wherein the first control information comprises first index information, the first index information being used for indicating time-domain resource information corresponding to each transmission of the multiple SL transmissions;
wherein the determining, by the first terminal according to the first control information, resource used for the multiple SL transmissions comprises: determining, by the first terminal according to the first index information and a first correspondence, time-domain resource used for the multiple SL transmissions, the first correspondence being a correspondence between index information and time-domain resource information; and the method further comprises:
determining, by first terminal according to the first index information, a number of transmissions of the multiple SL transmissions, wherein time-domain resource corresponding to the first index information is a time unit used for the multiple SL transmissions.

* * * * *